United States Patent
Pflueger et al.

(10) Patent No.: US 10,384,158 B2
(45) Date of Patent: Aug. 20, 2019

(54) FILTER ELEMENT HAVING FILTER BELLOWS

(71) Applicant: Mann+Hummel GMBH, Ludwigsburg (DE)

(72) Inventors: Frank Pflueger, Sachsenheim (DE); Fabian Wagner, Moeglingen (DE); Christian Thalmann, Speyer (DE); André Roesgen, Remshalden (DE); Robert Hasenfratz, Waiblingen (DE); Daniel Schmid, Sachsenheim (DE); Timo Dirnberger, Marbach (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 282 days.

(21) Appl. No.: 15/160,817

(22) Filed: May 20, 2016

(65) Prior Publication Data

US 2016/0263513 A1    Sep. 15, 2016

Related U.S. Application Data

(63) Continuation of application No. PCT/EP2014/075086, filed on Nov. 20, 2014.

(30) Foreign Application Priority Data

Nov. 20, 2013   (DE) .................. 10 2013 019 327

(51) Int. Cl.
*B01D 46/00* (2006.01)
*B01D 39/18* (2006.01)
(Continued)

(52) U.S. Cl.
CPC .......... *B01D 46/521* (2013.01); *B01D 39/18* (2013.01); *B01D 46/0004* (2013.01);
(Continued)

(58) Field of Classification Search
CPC .. B01D 46/0004; B01D 46/10; B01D 46/521; B01D 46/523; B01D 39/18; B01D 2275/206
(Continued)

(56) References Cited

U.S. PATENT DOCUMENTS 3,646,855 A * 3/1972 Muller ................. A24D 3/0204
493/43
5,622,583 A    4/1997 Ernst et al.
(Continued)

FOREIGN PATENT DOCUMENTS

CN   102580424 A    7/2012
DE   3622955 A1    1/1988
(Continued)

*Primary Examiner* — Robert A Hopkins
(74) *Attorney, Agent, or Firm* — James Hasselbeck

(57) ABSTRACT

A filter element for filtering a fluid, including: a filter bellows made of a filter medium folded into zig-zag-shaped pleats along fold edges, each pleat extending between opposing end edges of the filter bel-lows, and being laterally sealed at the end edges by means of at least one sealant track or a sideband; wherein the filter bellows includes a first element section; and a second element section, which include each on opposing end faces end edge surfaces and that substantially run parallel to one another, wherein, from one element section to another element section, at least one of the end edge surfaces changes direction.

22 Claims, 6 Drawing Sheets

(51) Int. Cl.
 *B01D 46/52* (2006.01)
 *B01D 46/10* (2006.01)
 *F02M 35/02* (2006.01)
 *F02M 35/024* (2006.01)

(52) U.S. Cl.
 CPC .......... *B01D 46/10* (2013.01); *B01D 46/523* (2013.01); *F02M 35/0201* (2013.01); *F02M 35/0245* (2013.01); *F02M 35/02491* (2013.01); *B01D 2275/206* (2013.01)

(58) Field of Classification Search
 USPC .................................. 55/495, 497, 503, 521
 See application file for complete search history.

(56) References Cited

U.S. PATENT DOCUMENTS

| | | | |
|---|---|---|---|
| 6,508,932 | B1 | 1/2003 | Mueller et al. |
| 6,511,623 | B1 | 1/2003 | Ueda et al. |
| 9,630,475 | B2 * | 4/2017 | Bayerlein .......... B01D 46/0006 |
| 2007/0193236 | A1 * | 8/2007 | Merritt ............... B01D 46/0004 55/498 |
| 2010/0064643 | A1 | 3/2010 | Greif |
| 2010/0229513 | A1 * | 9/2010 | Eisengraeber-Pabst ..................... B01D 46/10 55/385.3 |
| 2011/0247582 | A1 | 10/2011 | Blossey et al. |

FOREIGN PATENT DOCUMENTS

| | | |
|---|---|---|
| DE | 4238735 A1 | 5/1994 |
| DE | 19824506 C1 | 7/1999 |
| DE | 20310833 U1 | 11/2004 |
| DE | 202004000073 U1 | 5/2005 |
| DE | 20122455 U1 | 11/2005 |
| DE | 202006015629 U1 | 12/2006 |
| DE | 202007015847 U1 | 1/2008 |
| DE | 102007016161 A1 | 10/2008 |
| EP | 1616736 A1 | 1/2006 |
| EP | 2319602 A1 | 5/2011 |

* cited by examiner

FILTER ELEMENT HAVING FILTER BELLOWS

TECHNICAL FIELD

The invention relates to a filter element for filtering a fluid, said element having filter bellows made of a filter medium folded into zig-zag-shaped pleats in particular for use as a flat air filter of an internal combustion engine, in particular of a motor vehicle.

BACKGROUND OF THE INVENTION

End pleats are the two outer pleats on opposing end faces of the filter bellows of a filter element. End edges are the two free edges of the filter medium from which the filter bellows is made, which run along the end pleats and confine these at the end faces of the filter bellows. End edges of the filter bellows are the two other free edges of the filter bellows, which extend between the end edges and run along the folding of the filter bellows. The fold edges are the edges along which the filter medium is folded. In a zig-zag folded, roughly rectangular-shaped filter bellows known from the market the end edges and the fold edges usually run parallel to one another. The end edges viewed from the side to the filter bellows run zig-zag-shaped and perpendicular to the end edges and fold edges. Before folding of the filter medium, the end edges of the later roughly rectangular-shaped imagined enveloping filter bellows run straight and parallel to one another. The imagined enveloping is clamped by the end edges, the fold edges adjacent on a clean fluid side of the filter bellows neighboring fold edges or end edges and on a raw fluid side neighboring fold edges or end edges.

The filter media for filter bellows of flat filter elements are not closed, which means that the end pleats are not connected with each other just as the end edges. In contrast, the filter media for filter bellows of round filter elements are closed, which means that the end pleats are connected with each other. Filter bellows of flat filter elements can be level but also have bends in different directions.

SUMMARY OF THE INVENTION

Thus, one of the invention's tasks is to provide a filter element for filtering a fluid that allows utilization of flexible installation spaces, especially in motor vehicles.

The above mentioned task is solved according to an aspect of the invention by a filter element with a filter bellows, which includes at least a first element section and a second element section, each having end edge surfaces running substantially parallel to one another on opposing end faces, wherein, from one element section to another element section, at least one of the end edge surfaces changes direction.

Favorable configurations and advantages of the invention arise from further claims, the description and the drawing.

It recommends a filter element for filtering a fluid, in particular of an internal combustion engine, in particular of a motor vehicle, said element having filter bellows made of a filter medium folded into zig-zag-shaped pleats, along fold edges, each pleat extending between opposing end edges of the filter bellows, and in particular being laterally sealed at the end edges by means of at least one sealant track or sideband. The filter bellows includes at least a first element section and a second element section, each having end edge surfaces running substantially parallel to one another on opposing end faces, wherein, from one element section to another element section, at least one of the end edge surfaces changes direction.

In particular, the filter bellows with the first and second element section is a single filter bellows and not a composite filter bellows, i.e. the single filter bellows is made of a continuous filter medium web.

Substantially parallel to each other extending end edge surfaces means that the end edge surfaces extend at an angle to one another which is at least less than 5°, in particular but is almost 0°.

The filter system with the filter element according to the invention allows favorable utilization of available installation space when fitting the filter system, which especially in motor vehicles is extremely tight. With the same complex installation space an increase of the capacity of the filter element is thus possible. In conjunction with clamping of the filter element in a frame, the filter element can be adjusted to any imaginable 3D geometry.

The advantages of the filter element according to the invention with a zig-zag-shaped filter medium for filtering a fluid, in particular of a motor vehicle, result from better utilization of installation space by the filter element. Space requirements in motor vehicles result in diverse outer geometries of a filter element such as triangular, trapezoidal, double trapezoidal shape, which is favorable for an application in the engine or interior of a motor vehicle. The advantage of the filter element according to the invention is that a substantially not rectangular filter bellows can be gotten into the wanted shape by a trim. Also previously known trim geometries are characterized in that they run along the end edge and have an intersecting angle greater than or equal 180°. The filter element according to the invention allows substantially greater design flexibility and flexibility in the installation in complex installation spaces. The filter element can thus include different element sections, which allow the end edge surfaces independently from one another to change directions. This also allows constituting undercuts in the filter bellows. These changes of direction must not necessarily include only level end edge surfaces, but may be extended to curved end edge surfaces. This is especially advantageous since in addition to the flexible installation space design, this enables a one-piece manufacture of the filter element and furthermore the housing stability can be increased by a curved shape.

The pleats at the end edges of the filter bellows are laterally sealed by means of at least one sealant track. Ideally, a hot melt adhesive can be used for this. Alternatively, a sealing with a sideband is also conceivable. In the event that one or more sidebands are used for the lateral sealing, the sidebands are preferably formed from a flexible fleece strip, which is particularly glued to the associated end edge. The use of the hot melt adhesive however provides a preferred cost-effective way, which in addition has the advantage of high flexibility and design freedom.

Advantageously, an additional element section can be arranged between the first and the second element section, wherein the change of direction can occur on one or both opposing end edge surfaces. For example, it is possible for an end edge surface to be extended as a level surface, while the opposing end edge surface is extended at an angle, which can also be less than 180°, until the end edge surface meets an end edge surface of the second element section.

Thereby, the change of direction can occur conveniently at an interface between the first element section and the second element section. In this way, the fold edges for example can be continued parallel, while for example the end edge surfaces bend at an angle and also continue to run substantially parallel to one another. In another embodiment, the two end edge surfaces can be continued nonparallel. This allows changes of direction of end edge surfaces to be designed very flexibly and modularly.

Further extended with several element sections of the filter element, the change of direction can be at an interface between the first element and the additional element sections and/or between the additional element section and the second element section. Thus it is possible, that for example, the first and the second element section are each rectangular, but with different lengths of pleats, while the element section arranged in between implements the transition of the end edge surfaces of the first element section and the second element section and the change of direction exactly between the element sections.

In a favorable configuration, the change of direction of at least one end edge surface can have an angle of less than 180°, measured between the end edge surfaces outside of the filter bellows. In this way it is possible, for example, to transition from a narrower element section to a wider element section or even to extend just one element section with substantially parallel end edge surfaces as element section with also parallel but obliquely extended end edge surfaces. Rectangular element sections with different depths can be put together or extended this way.

Alternatively, the change of direction on at least one end edge surface can have a concave curved section, as viewed from outside of the filter bellows. Thus also element sections with curved end edges can be constituted, which very flexibly can be adapted to more complex installation space specifications. Thus, it is possible, for example, to implement semicircular layouts or recesses of a filter element in a cost-effective way. In this way, it is possible to effectively fill with the filter element a filter housing, which as a result of installation space specifications is fitted with more complex recesses.

Similarly favorable can the change of direction of at least one end edge surface have a convex curved portion, as viewed from outside the filter bellows. Thus, in the same manner as concave curved sections, element sections with curved end edges can be constituted, which deviate outward from a flat end edge surface and bulge outward. In this way, they can be flexibly adapted to more complex installation space specifications.

In another favorable configuration, the change of direction of at least one end edge surface can have successively oppositely curved sections, i.e. a convex curved section followed by a concave curved portion, as seen from outside of the filter bellows. In this way, it is possible to constitute a continuously curved course in an end edge surface of a filter element and to so adapt to constructively favorably designed filter housing dimensions.

In a favorable configuration a continuous transition of an end edge surface of an element section across an end edge surface of a subsequent element section to an end edge surface of a subsequent element section can thus be formed. In this way, filter elements can be manufactured which have no corners or edges in the course of the end edge surfaces.

Advantageously, a circumferential seal can be provided on the circumference of filter bellows. In this way, an effective sealing of the filter element is possible when installing the filter element in a filter housing, and thus the separation between a raw fluid side and a clean fluid side. The effectiveness of a filter system essentially depends on a reliable separation of the raw fluid side from the clean fluid side. Especially the sealing under a wide range of environmental conditions when deployed in a motor vehicle must function, which includes big differences in temperature, humidity, vibration and the like. Leaks of the filter system between the raw fluid side and the clean fluid side can be avoided almost certainly.

Especially advantageous as circumferential seal, a congruent foamed seal on the filter bellows can be provided. Thereby it is possible to constitute a connection as firm as possible between the filter bellows and the seal, which is also essentially permanently sealing and thus ensures the effectiveness of the filter system at least over the service life of the filter element. As a material for the foamed seal materials such as polyurethane foams can be used, which allow a very flexible design and on the other hand a firm and durable connection. Also the production processes are designed in a flexible way that conventional filter media can be compatibly covered with foam with no degradations occurring at the interfaces between plastic and filter medium. In this way, large design options of the form of the filter element can be achieved.

According to an advantageous configuration, the circumferential seal can be arranged on end edges and side edges. In this way, it is possible to insert the filter element in the housing lower part of a filter housing, so that the top of the filter element is flush with a housing edge and the housing upper part can be placed thereon. In this way, the raw fluid side of the filter element can be favorably sealed off from the clean fluid side of the filter element. Even when changing the filter element, a contamination of the clean side of the filter system is avoidable.

In an advantageous configuration on the circumference of the filter bellows, a circumferential seal can be provided, whose average width in the area of the convex and/or concave curved sections of the end edge surfaces is wider than outside of the sections. As a result, tools for the manufacturing of the circumferential seal through injection onto to the filter bellows can be favorably designed and manufactured economically. The entire production costs of a filter element can be reduced in this way.

In a useful configuration, the filter bellows can include at least three element sections, wherein the middle element section includes each on opposing end faces end edge surfaces that substantially run parallel to one another. In this way, filter elements with step-like layout can be constituted, which if necessary can even be nested to favorably fill a complex installation space. Also favorable flow conditions can be accomplished thereby because in this way the flow cross-section is designable as homogeneous as possible across the cross sectional area of the filter element.

According to an advantageous configuration, the filter bellows may include at least three element sections, wherein said middle element section includes at least one concave curved section subsequent to a convex curved section on at least one of the end edge surfaces. In this way, it is possible to constitute a continuous course in a curved end edge surface of a filter element and to so adapt to constructively favorably designed filter housing dimensions.

According to another advantageous configuration, the stiffening web can be arranged transversely to the pleats so that the fold edges are fixed by the stiffening web. The pleats of the filter medium experience thus an additional support on an end edge seal, for example, by a tape or a bonding, which overall mechanically stabilizes the filter bellows and thereby supports the filter bellows against a flow pressure of the fluid to be filtered. This way, the service life of the filter element can be favorably increased.

According to an advantageous configuration, the pleats can have a different pleat height, in particular a pleat height that continuously changes from one side edge to another side edge of the filter bellows. Specifically, the pleat height on one end of the filter bellows to another end of the filter bellows can increase or decrease, so that a wedge-like shape of the height of the filter bellows can be constituted, which can prove favorably for certain installation requirements in motor vehicles.

Advantageously, cellulose can be used as a filter medium. Favorably fleeces are used as filter media. Cellulose is for that very flexible and from environmental points of view has a great advantage due to easy degradability.

According to another aspect, the invention relates to an arrangement of at least two filter elements, wherein two complimentary arranged filter bellows with their complementary end edge surfaces are assembled adjacent to each other so that they connect after each other in a fluid-tight manner. In this way, it is possible to cover a larger filter system with two filter elements. Thus it is possible to realize rectangular outer geometries of a filter system, although the filter elements per se have continuous running, concave and/or convex curved end edge geometries.

According an advantageous configuration, the filter bellows can include at least three element sections, wherein said middle element section includes at least one concave curved section subsequent to a convex curved section on at least one of the end edge surfaces, and wherein the at last two filter elements can be connected to each other in a fluid-tight manner via the middle element section. This allows realizing a rectangular outer geometry of a filter element through complementary combination of two filter bellows, although the filter elements per se have continuous running, concave and/or convex curved end edge geometries.

According to a further aspect, the invention relates to a filter system including a filter element, wherein the replaceable filter element is arranged in a filter housing, which includes at least a housing lower part and a housing upper part which are connected in a detachable and fluid-tight manner, and wherein the filter element separates a raw side from a clean side of the filter system in a fluid-tight manner. In this way, it is possible to insert the filter element in the housing lower part of a filter housing, so that the top of the filter element is flush with a housing edge and the housing upper part can be placed thereon. In this way, the raw fluid side of the filter element can be favorably sealed off from the clean fluid side of the filter element. The filter element is easily replaceable when loaded with dirt. Also, when changing the filter element with such an arrangement, a contamination of the clean side of the filter system is avoidable.

According to another aspect, the invention relates to the use of the filter system as a flat air filter, in particular as a flat air filter of an internal combustion engine. Use for other flowing media, such as oil, fuel, urea and the like is also conceivable.

BRIEF DESCRIPTION OF THE DRAWINGS

Further advantages arise from the following drawing description. The drawings show embodiments of the invention. The drawings, the description and the claims contain numerous features in combination. The person skilled in the art will expediently consider the features individually and combine them into meaningful further combinations.

Showing by way of example.

DESCRIPTION OF THE INVENTION

Figure 1:
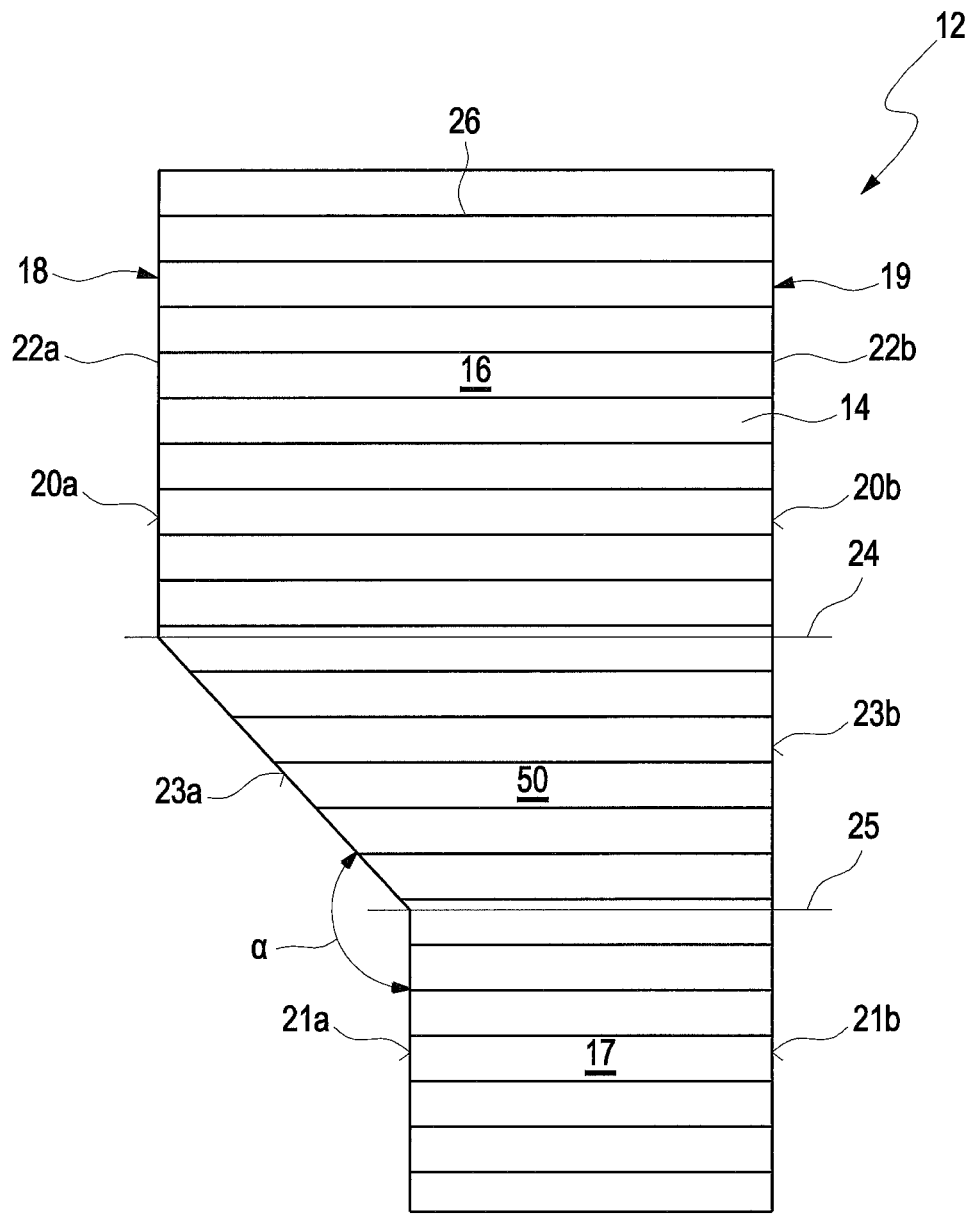
FIG. 1 a top view of a filter bellows according to an embodiment of the invention with three element sections.

The same or similar components in the figures are referenced with same reference numerals. The figures merely show examples and are meant to be restricting.

FIG. 1 shows a top view of a filter bellows 12 according to an embodiment of the invention with three element sections 16, 50, 17. The filter bellows 12, as well as the filter bellows described below, are made from a continuous filter medium web. Thereby, between the first and the second element section 16, 17 an additional element section 50 is arranged, wherein on one or both opposing end edge surfaces 23a, 23b of the additional element section 50 the change of direction occurs. The change of direction occurs on an interface 24 between the first element section 16 and the additional element section 50 and on an interface 25 between the additional element section 50 and the second element section 17. The change of direction has an angle α of less than 180° at the transition of the end edge surface 23a to the end edge surface 21a, measured between the end edge surfaces 23a and 21a outside of filter bellows 12. The face edge 23b is, however, extended in a direction from the end edge surface 20b to the end edge surface 21b. The fold edges 26 of the filter medium 14 run parallel across all three element sections 16, 50, 17.

Figure 2:
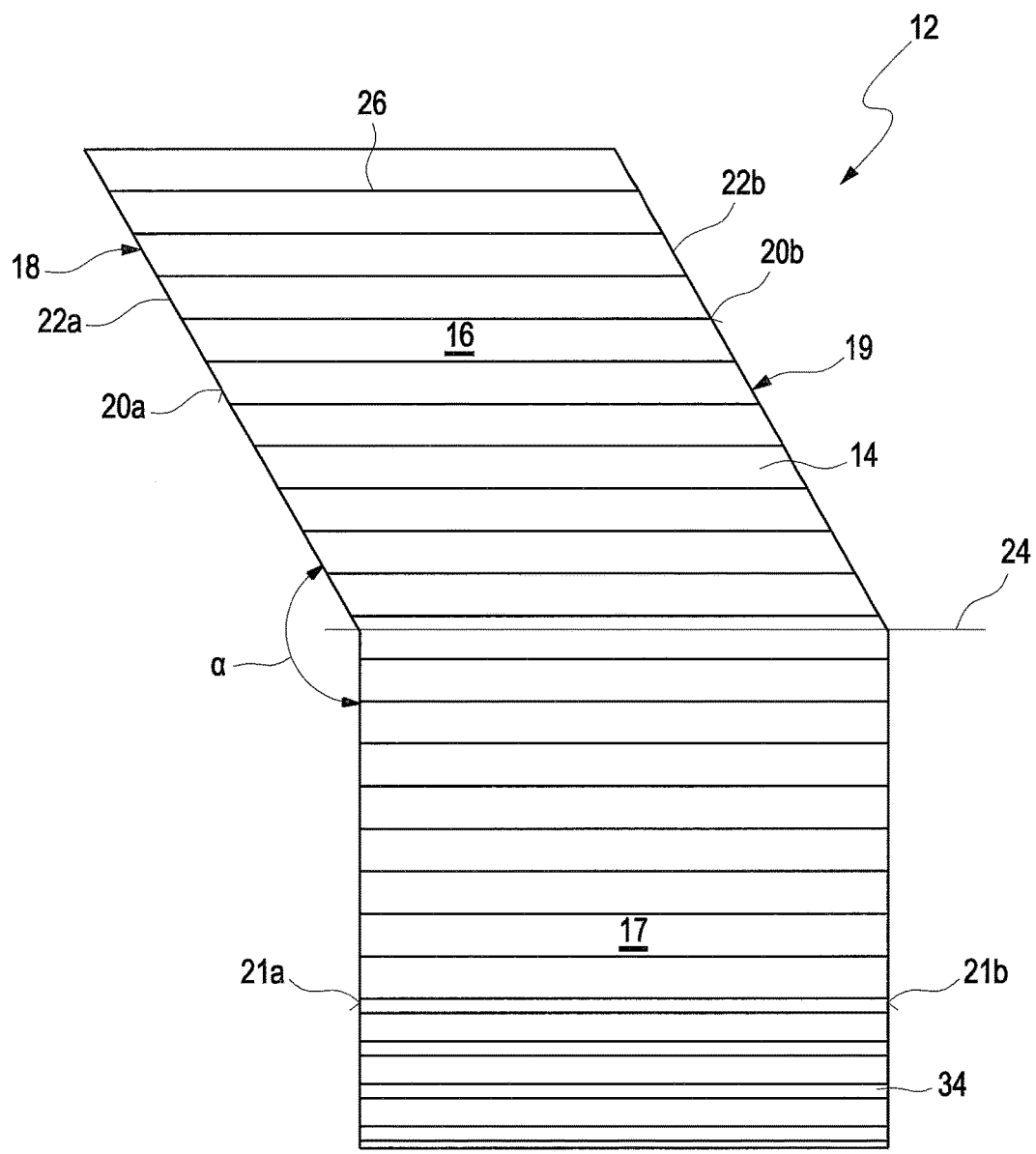
FIG. 2 a top view of a filter bellows according to another embodiment of the invention with two element sections.

FIG. 2 is a top view of a filter bellows 12 according to another embodiment of the invention with two element sections 16, 17. The change of direction of the end edge surfaces 20a to 21a in the end surface 18 or end edge surfaces 20b to 21b in the end surface 19 occurs thereby on an interface 24 between the first element section 16 and the second element section 17. The lower part of the element section 17 shows the erected pleats 34 of the filter medium 14, the remaining area merely shows the fold edges 26.

Figure 3:
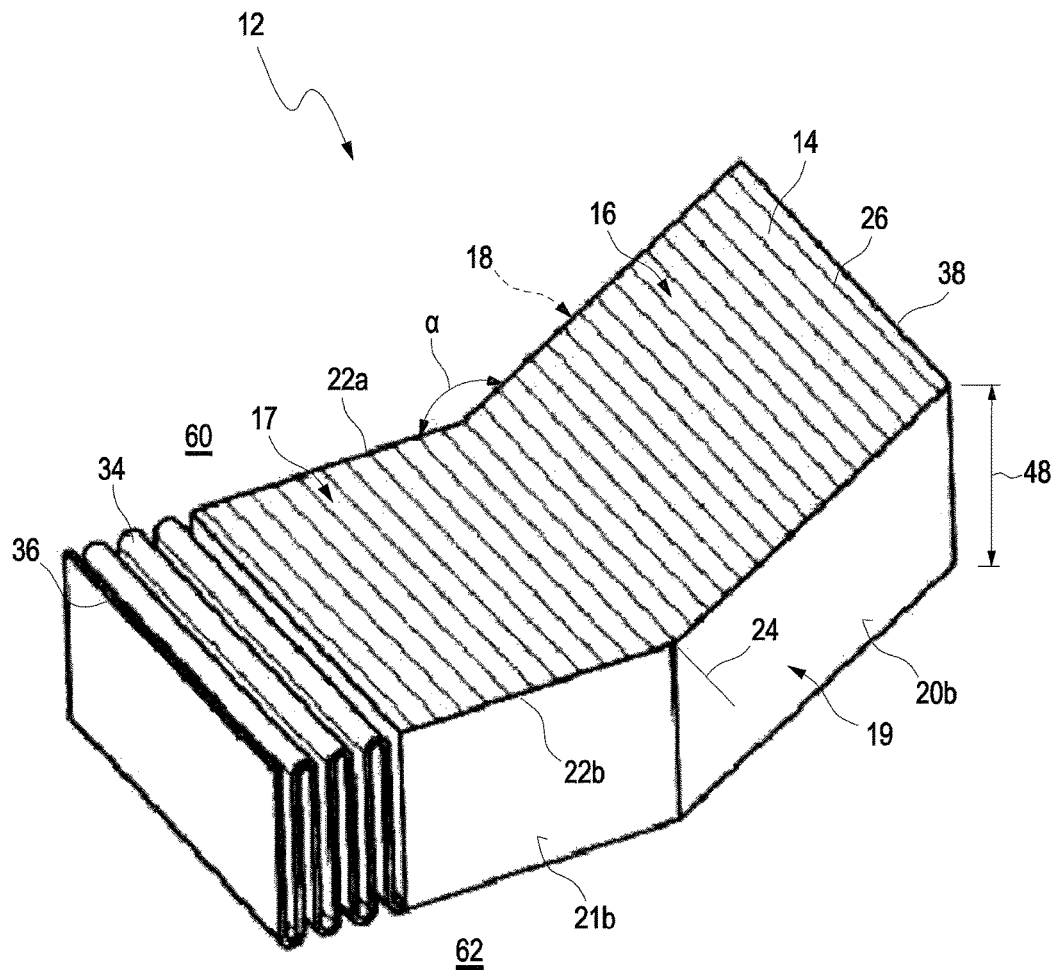
FIG. 3 an isometric representation of the filter bellows of FIG. 2 with two element sections.

FIG. 3 shows an isometric representation of the filter bellows 12 of FIG. 2 with two element sections 16, 17. The left part of the element section 17 shows the erected pleats 34 of the filter medium 14, the remaining area merely shows schematically the fold edges 26. The filter bellows 12 is also purely shown schematically. In the representation, for example, the raw fluid area 60 can be seen from the top on the filter bellows 12, while the clean fluid area 62 is arranged below the filter bellows 12. The pleats 34 close at both ends of the filter bellows 12 with the side edges 36 and 38. The pleats 34 have a same pleat height 48.

Figure 4:
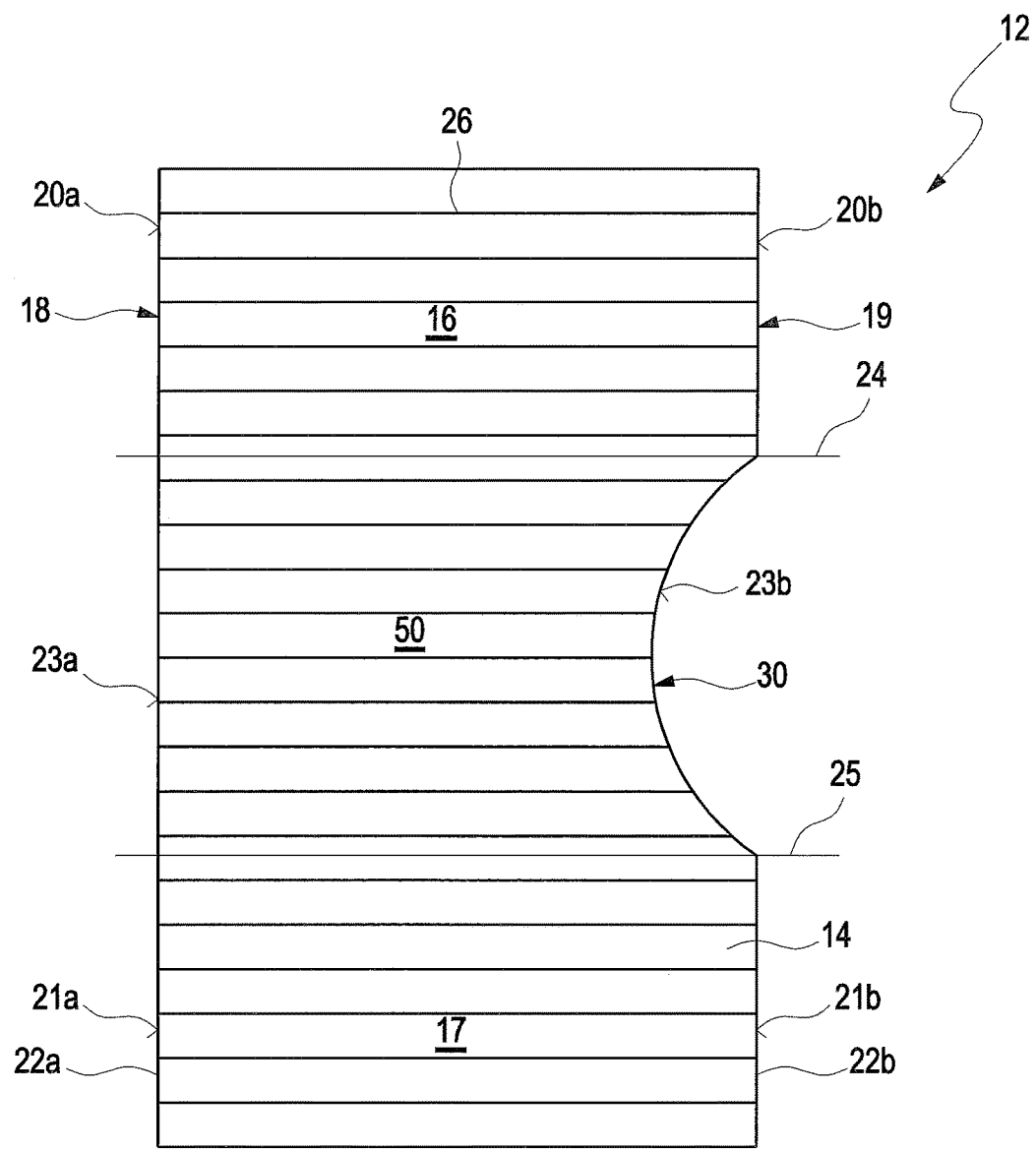
FIG. 4 a top view of a filter bellows according to another embodiment of the invention with a concave change of direction of an end edge surface.

FIG. 4 is a top view of a filter bellows 12 according to another embodiment of the invention with concave change of direction of an end edge surface 23b represented in the end surface 19, as seen from outside of the filter bellows 12, so that a concave curved section 30 of the end edge surface 23b in the element section 50 is shown. Such a change of direction is typically necessary, for example, if the filter housing has recesses at this location due to installation space specifications and the filter element 10 is to use the available installation space as favorable as possible.

Figure 5:
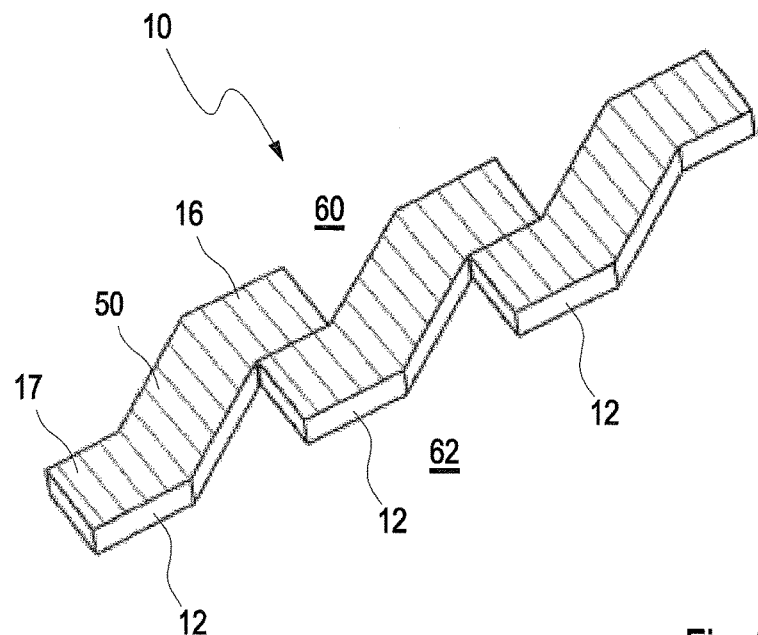
FIG. 5 an isometric representation of a filter element according to another embodiment of the invention with a series of step-like filter bellows.

FIG. 5 is an isometric representation of the filter bellows 10 according to another embodiment of the invention with a series of individual filter bellows 12. An individual filter bellows 12 includes three element sections 16, 17, 50, wherein said middle element section 50 includes each on opposing end faces 18, 19 end edge surfaces 20a, 20b and 21a, 21b that substantially run parallel to one another. The individual filter bellows 12 are put together step-like so as to realize a filter element 10 with a complex designed outer contour.

Figure 6:
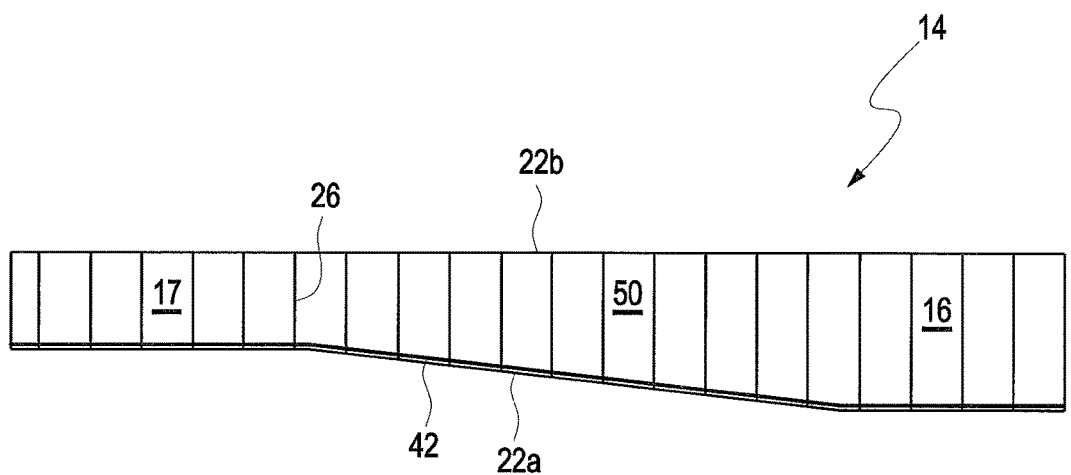
FIG. 6 a top view of an unwound filter medium according to an embodiment of the invention with applied sealant track to seal the end edges.

FIG. 6 shows a top view of an unwound filter medium 14 according to an embodiment of the invention with applied sealant track 42 to seal the end edges 22a. The individual fold edges 26 with unfolded pleats 34 are parallel aligned, while the individual element sections 16, 50, 17 have different widths and the end edges 22a include a change of direction at the transition from element section 16 to element section 50 to the element section 17. The end edge 22b however runs in a straight line across all three element sections 16, 50, 17. The sealant track 42 for bonding and sealing the end edges 22a, 22b is applied immediately adjacent on the end edges 22a, 22b.

Advantageously, cellulose can be used as a filter medium 14. Favorably fleeces are used as filter media 14. Cellulose is for that very flexible and from environmental points of view has a great advantage due to easy degradability.

Figure 7:
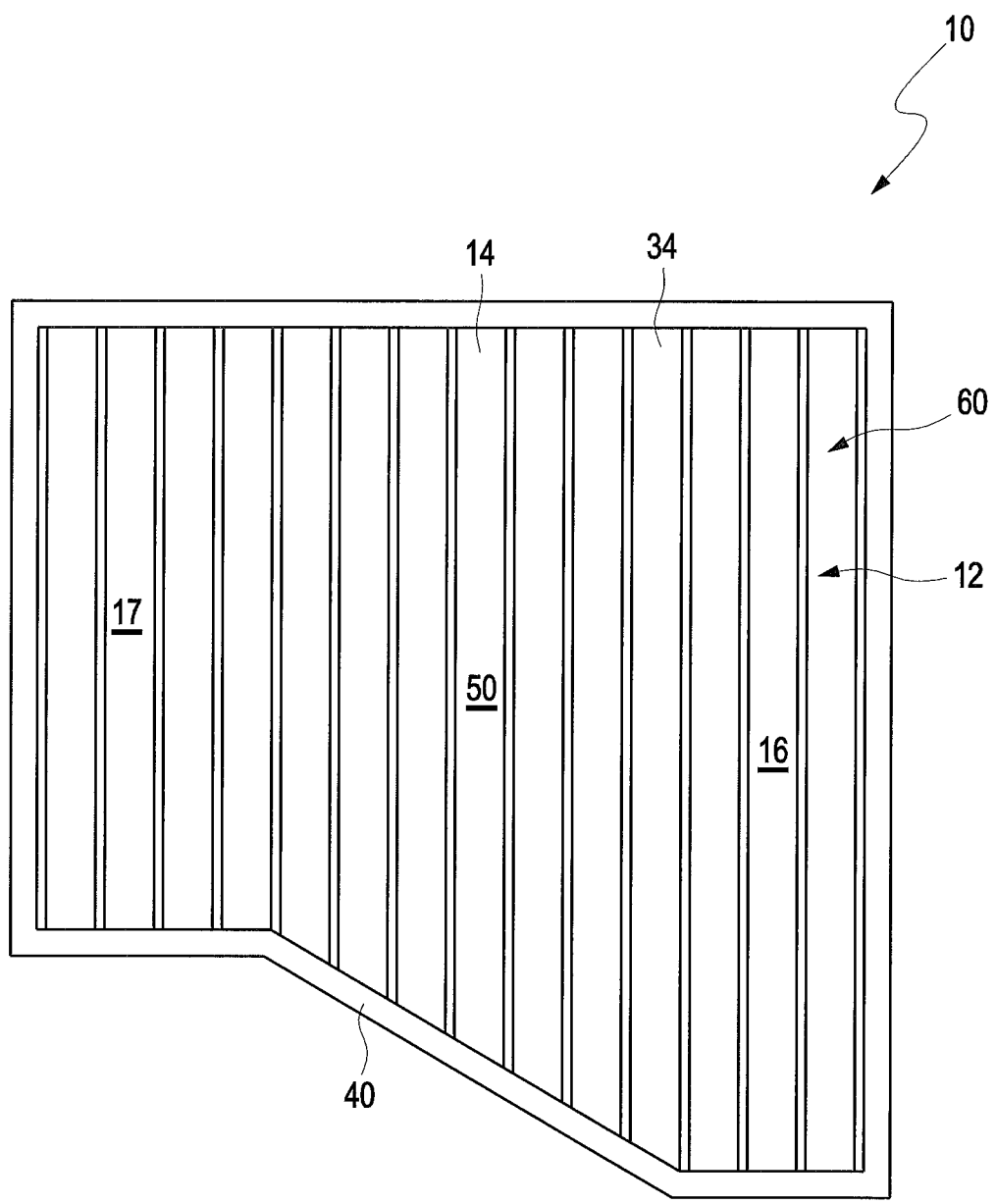
FIG. 7 an isometric representation of a filter element according to an embodiment of the invention, made from the filter medium shown in FIG. 6.

FIG. 7 shows an isometric representation of a filter element 10 according to an embodiment of the invention, made from the filter medium 14 shown in FIG. 6. The filter element 10 for filtering a fluid, in particular of an internal combustion engine, in particular of a motor vehicle, said element having filter bellows 12 made of a filter medium 14 folded into zig-zag-shaped pleats 34 along fold edges 26, each pleat 34 extending between opposing end edges 22a, 22b of the filter bellows 12, and being laterally sealed at the end edges 22a, 22b by means of at least one sealant track 42. The filter element includes a first element section 16 and a second element section 17 as well as an additional element section 50, which includes each on opposing end faces 18, 19 end edge surfaces 20a, 20b and 21a, 21b as well as 23a, 23b that substantially run parallel to one another, wherein, from one element section 16, 17 to another element section 17, 16 at least one of the end edge surfaces 20a, 20b changes direction. The filter medium 14 of FIG. 8 is folded, the end edges 22a, 22b are bonded and sealed such, that a filter bellows 12 of three element sections 16, 50, 17 was formed. On the circumference of filter bellows 12 a circumferential seal 40 is provided, which is drawn schematically. Favorably, a congruent foamed seal on the filter bellows 12, for example, of polyurethane foam, can be provided.

What is claimed is:

1. A filter element for filtering a fluid, comprising:
   a filter bellows made of a filter medium folded into a plurality of zig-zag-shaped pleats along pleat fold edges, each pleat fold edge extending from a first end edge of the pleat to an opposite second end edge of the pleat;
   wherein the filter bellows is a continuous sheet of filter medium without interruptions;
   wherein each pleat has:
      a first fold edge on a raw fluid side of the filter bellows, and
      a second fold edge on a clean fluid side of the filter medium;
      wherein the first and second folded edges each run from a first end edge of the pleat to an opposite second end edge of the pleat;
   wherein, in the filter bellows:
      the first fold edges of the plurality of zig-zag-shaped pleats forms an raw fluid flow face of the filter bellows, through which fluid enters the filter bellows; and
      the second fold edges of the plurality of zig-zag-shaped pleats forms a clean fluid flow face of the filter bellows, through which filtered fluid exists the filter bellows;
      wherein the first end edges of the plurality of zig-zag-shaped pleats forms a first end edge surface of the filter bellows;
      wherein the opposite second fold edges of the plurality of zig-zag-shaped pleats forms a second end edge surface of the filter bellows;
      wherein the first fold edges of the plurality of zig-zag-shaped pleats runs from the first end edge surface of the filter bellows to the second end edge surface of the filter bellows;
      wherein the second fold edges of the plurality of zig-zag-shaped pleats runs from the first end edge surface of the filter bellows to the second end edge surface of the filter bellows;
      wherein the first end edge surface and the second end edge surface each run from the raw fluid flow face to the clean fluid flow face of the filter bellows;
   wherein the filter bellows of the continuous sheet of filter medium has:
      a first filter bellows section having a first set of zig-zag-shaped pleats, arranged adjacently to each other;
      a second first filter bellows section having a second set of zig-zag-shaped pleats, arranged adjacently to each other;
      at least one sealant track or a sideband, laterally sealing the plurality of zig-zag-shaped pleats at the first and second end edges;
   wherein the first end edge surface and the second end edge surface are substantially run parallel to one another;
   wherein from the first filter bellows section to the second filter bellows section, at least one of the end edge surfaces changes direction;
   wherein the change of direction of at least one end edge surface is a convex curved section, as seen from the outside of the filter bellows.

2. The filter element according to claim 1, wherein the change of direction of at least an end edge surface comprises consecutive opposite curved sections.

3. The filter element according to claim 2, wherein a continuous transition of an end edge surface of an element section via an end edge surface of a subsequent element section to an end edge surface of a subsequent element section is formed.

4. The filter element according to claim 1, wherein on the circumference of filter bellows a circumferential seal is provided.

5. The filter element according to claim 1, wherein a circumferential seal formed as a congruent foamed seal on the filter bellows is provided.

6. The filter element according to claim 1, wherein the circumferential seal is arranged on end edges and side edges.

7. The filter element according to claim 1, wherein the filter medium is a cellulose filter medium.

8. A filter element for filtering a fluid, comprising:
a filter bellows made of a filter medium folded into a plurality of zig-zag-shaped pleats along pleat fold edges, each pleat fold edge extending from a first end edge of the pleat to an opposite second end edge of the pleat;
wherein the filter bellows is a continuous sheet of filter medium without interruptions;
wherein each pleat has:
  a first fold edge on a raw fluid side of the filter bellows, and
  a second fold edge on a clean fluid side of the filter medium;
  wherein the first and second folded edges each run from a first end edge of the pleat to an opposite second end edge of the pleat;
wherein, in the filter bellows:
  the first fold edges of the plurality of zig-zag-shaped pleats forms an raw fluid flow face of the filter bellows, through which fluid enters the filter bellows; and
  the second fold edges of the plurality of zig-zag-shaped pleats forms a clean fluid flow face of the filter bellows, through which filtered fluid exists the filter bellows;
  wherein the first end edges of the plurality of zig-zag-shaped pleats forms a first end edge surface of the filter bellows;
  wherein the opposite second fold edges of the plurality of zig-zag-shaped pleats forms a second end edge surface of the filter bellows;
  wherein the first fold edges of the plurality of zig-zag-shaped pleats runs from the first end edge surface of the filter bellows to the second end edge surface of the filter bellows;
  wherein the second fold edges of the plurality of zig-zag-shaped pleats runs from the first end edge surface of the filter bellows to the second end edge surface of the filter bellows;
  wherein the first end edge surface and the second end edge surface each run from the raw fluid flow face to the clean fluid flow face of the filter bellows;
wherein the filter bellows of the continuous sheet of filter medium has:
  a first filter bellows section having a first set of zig-zag-shaped pleats, arranged adjacently to each other;
  a second first filter bellows section having a second set of zig-zag-shaped pleats, arranged adjacently to each other;
  at least one sealant track or a sideband, laterally sealing the plurality of zig-zag-shaped pleats at the first and second end edges;
wherein the first end edge surface and the second end edge surface are substantially run parallel to one another;
wherein from the first filter bellows section to the second filter bellows section, at least one of the end edge surfaces changes direction;
wherein the filter bellows comprises at least three element sections;
wherein a middle element section of the at least three element sections has a concave curved section subsequent to a convex curved section on at least one of the end edge surfaces.

9. The filter element according to claim 8, wherein on the circumference of the filter bellows a circumferential seal is provided, whose average width in the area of the convex and/or concave curved sections of the end edge surfaces is wider than outside of the sections.

10. The filter element according to claim 8, wherein on the circumference of filter bellows a circumferential seal is provided.

11. The filter element according to claim 8, wherein the circumferential seal is arranged on end edges and side edges.

12. The filter element according to claim 8, wherein the filter medium is a cellulose filter medium.

13. A filter element for filtering a fluid, comprising:
a filter bellows made of a filter medium folded into a plurality of zig-zag-shaped pleats along pleat fold edges, each pleat fold edge extending from a first end edge of the pleat to an opposite second end edge of the pleat;
wherein the filter bellows is a continuous sheet of filter medium without interruptions;
wherein each pleat has:
  a first fold edge on a raw fluid side of the filter bellows, and
  a second fold edge on a clean fluid side of the filter medium;
  wherein the first and second folded edges each run from a first end edge of the pleat to an opposite second end edge of the pleat;
wherein, in the filter bellows:
  the first fold edges of the plurality of zig-zag-shaped pleats forms an raw fluid flow face of the filter bellows, through which fluid enters the filter bellows; and
  the second fold edges of the plurality of zig-zag-shaped pleats forms a clean fluid flow face of the filter bellows, through which filtered fluid exists the filter bellows;
  wherein the first end edges of the plurality of zig-zag-shaped pleats forms a first end edge surface of the filter bellows;
  wherein the opposite second fold edges of the plurality of zig-zag-shaped pleats forms a second end edge surface of the filter bellows;
  wherein the first fold edges of the plurality of zig-zag-shaped pleats runs from the first end edge surface of the filter bellows to the second end edge surface of the filter bellows;
  wherein the second fold edges of the plurality of zig-zag-shaped pleats runs from the first end edge surface of the filter bellows to the second end edge surface of the filter bellows;
  wherein the first end edge surface and the second end edge surface each run from the raw fluid flow face to the clean fluid flow face of the filter bellows;
wherein the filter bellows of the continuous sheet of filter medium has:
  a first filter bellows section having a first set of zig-zag-shaped pleats, arranged adjacently to each other;
  a second first filter bellows section having a second set of zig-zag-shaped pleats, arranged adjacently to each other;

at least one sealant track or a sideband, laterally sealing the plurality of zig-zag-shaped pleats at the first and second end edges;

wherein the first end edge surface and the second end edge surface are substantially run parallel to one another;

wherein from the first filter bellows section to the second filter bellows section, at least one of the end edge surfaces changes direction;

wherein a stiffening web is arranged transversely to the pleats so that the fold edges are fixed by the stiffening web.

14. The filter element according to claim 13, wherein on the circumference of filter bellows a circumferential seal is provided.

15. The filter element according to claim 13, wherein the circumferential seal is arranged on end edges and side edges.

16. The filter element according to claim 13, wherein the filter medium is a cellulose filter medium.

17. A filter element for filtering a fluid, comprising:
a filter bellows made of a filter medium folded into a plurality of zig-zag-shaped pleats along pleat fold edges, each pleat fold edge extending from a first end edge of the pleat to an opposite second end edge of the pleat;
wherein the filter bellows is a continuous sheet of filter medium without interruptions;
wherein each pleat has:
  a first fold edge on a raw fluid side of the filter bellows, and
  a second fold edge on a clean fluid side of the filter medium;
  wherein the first and second folded edges each run from a first end edge of the pleat to an opposite second end edge of the pleat;
wherein, in the filter bellows:
  the first fold edges of the plurality of zig-zag-shaped pleats forms an raw fluid flow face of the filter bellows, through which fluid enters the filter bellows; and
  the second fold edges of the plurality of zig-zag-shaped pleats forms a clean fluid flow face of the filter bellows, through which filtered fluid exists the filter bellows;
  wherein the first end edges of the plurality of zig-zag-shaped pleats forms a first end edge surface of the filter bellows;
  wherein the opposite second fold edges of the plurality of zig-zag-shaped pleats forms a second end edge surface of the filter bellows;
  wherein the first fold edges of the plurality of zig-zag-shaped pleats runs from the first end edge surface of the filter bellows to the second end edge surface of the filter bellows;
  wherein the second fold edges of the plurality of zig-zag-shaped pleats runs from the first end edge surface of the filter bellows to the second end edge surface of the filter bellows;
  wherein the first end edge surface and the second end edge surface each run from the raw fluid flow face to the clean fluid flow face of the filter bellows;
wherein the filter bellows of the continuous sheet of filter medium has:
  a first filter bellows section having a first set of zig-zag-shaped pleats, arranged adjacently to each other;
  a second first filter bellows section having a second set of zig-zag-shaped pleats, arranged adjacently to each other;
  at least one sealant track or a sideband, laterally sealing the plurality of zig-zag-shaped pleats at the first and second end edges;
  wherein the first end edge surface and the second end edge surface are substantially run parallel to one another;
  wherein from the first filter bellows section to the second filter bellows section, at least one of the end edge surfaces changes direction;
  wherein the pleats have a pleat height that continuously changes from one side edge to another side edge of the filter bellows.

18. The filter element according to claim 17, wherein on the circumference of filter bellows a circumferential seal is provided.

19. The filter element according to claim 17, wherein the circumferential seal is arranged on end edges and side edges.

20. The filter element according to claim 17, wherein the filter medium is a cellulose filter medium.

21. An arrangement of at least two filter elements for filtering a fluid, comprising:
two complimentary arranged filter bellows, each filter bellows made of a filter medium folded into a plurality of zig-zag-shaped pleats along pleat fold edges, each pleat fold edge extending from a first end edge of the pleat to an opposite second end edge of the pleat;
wherein each filter bellows is a continuous sheet of filter medium without interruptions;
wherein each pleat has:
  a first fold edge on a raw fluid side of the filter bellows, and
  a second fold edge on a clean fluid side of the filter medium;
  wherein the first and second folded edges each run from a first end edge of the pleat to an opposite second end edge of the pleat;
wherein, in each filter bellows of the two complimentary arranged filter bellows:
  the first fold edges of the plurality of zig-zag-shaped pleats forms an raw fluid flow face of the filter bellows, through which fluid enters the filter bellows; and
  the second fold edges of the plurality of zig-zag-shaped pleats forms a clean fluid flow face of the filter bellows, through which filtered fluid exists the filter bellows;
  the first end edges of the plurality of zig-zag-shaped pleats forms a first end edge surface of the filter bellows;
  the opposite second fold edges of the plurality of zig-zag-shaped pleats forms a second end edge surface of the filter bellows;
  the first fold edges of the plurality of zig-zag-shaped pleats runs from the first end edge surface of the filter bellows to the second end edge surface of the filter bellows;
  the second fold edges of the plurality of zig-zag-shaped pleats runs from the first end edge surface of the filter bellows to the second end edge surface of the filter bellows; and
  the first end edge surface and the second end edge surface each run from the raw fluid flow face to the clean fluid flow face of the filter bellows;

wherein each filter bellows of the two complimentary arranged filter bellows has:
  a first filter bellows section having a first set of zig-zag-shaped pleats, arranged adjacently to each other;
  a second first filter bellows section having a second set of zig-zag-shaped pleats, arranged adjacently to each other;
  at least one sealant track or a sideband, laterally sealing the plurality of zig-zag-shaped pleats at the first and second end edges;
  wherein the first end edge surface and the second end edge surface are substantially run parallel to one another; and
  wherein from the first filter bellows section to the second filter bellows section, at least one of the end edge surfaces changes direction;
wherein the two complementary arranged filter bellows with their complementary end edge surfaces are assembled adjacent to each other so that they are connected after each other in a fluid-tight manner.

22. The arrangement according to claim 21, wherein
the two complimentary arranged filter bellows comprise at least three element sections;
wherein a middle element section of the at least three element sections includes at least one concave curved section subsequent to a convex curved section on at least one of the end edge surfaces; and
wherein the at least two filter elements are connected to each other in a fluid-tight manner via the middle element section.

* * * * *